United States Patent [19]

Al'Hariri

[11] Patent Number: 4,910,070

[45] Date of Patent: Mar. 20, 1990

[54] OPAQUE DECORATIVE PLEATABLE MATERIAL AND METHOD OF MANUFACTURING SAME

[75] Inventor: Dhia K. Al'Hariri, Adel, United Kingdom

[73] Assignee: Technographics, Inc., Fitchburg, Mass.

[21] Appl. No.: 254,604

[22] Filed: Oct. 7, 1988

[51] Int. Cl.⁴ .......................... B32B 7/04; B32B 7/10; B32B 27/20; B32B 27/40; B41M 3/12

[52] U.S. Cl. .................................... 428/181; 156/226; 156/227; 156/238; 156/240; 427/148; 427/152; 428/196; 428/200; 428/204; 428/206; 428/207; 428/208; 428/211; 428/213; 428/241; 428/242; 428/248; 428/252; 428/334; 428/335; 428/336; 428/349; 428/354; 428/420; 428/914

[58] Field of Search ............... 428/181, 196, 200, 204, 428/206, 207, 208, 334, 335, 336, 349, 354, 420, 914

[56] References Cited

U.S. PATENT DOCUMENTS

| | | | |
|---|---|---|---|
| 2,235,514 | 3/1941 | Brown | 428/200 |
| 2,746,877 | 5/1956 | Matthes | 428/200 |
| 3,778,333 | 12/1973 | Rasmussen | 428/181 |
| 3,953,635 | 4/1976 | Dunning | 428/200 |
| 4,084,032 | 4/1978 | Pasersky | 428/200 |
| 4,517,237 | 5/1985 | Pernicano | 428/200 |
| 4,818,589 | 4/1989 | Johnson | 428/349 |

FOREIGN PATENT DOCUMENTS 1273468 5/1972 United Kingdom .

*Primary Examiner*—James C. Cannon
*Attorney, Agent, or Firm*—Peter J. Georges

[57] ABSTRACT

A decorative pleatable material adapted for the fabrication of pleated shades is described. The material is comprised of a pleatable fabric having a decorative resin coat containing desired pigment adhered to the face of the fabric by means of a polyurethane layer embedded in the structure of the fabric. The decorative resin coat is overlaid with a top-coat that prevents blocking during pleating. A preferred top-coat is comprised of a film forming cellulose derivative containing amorphous fumed silica. A film transfer strip for producing the decorative pleatable material is also described.

36 Claims, 1 Drawing Sheet

OPAQUE DECORATIVE PLEATABLE MATERIAL AND METHOD OF MANUFACTURING SAME

BACKGROUND OF THE INVENTION

1. Field of The Invention

The present invention relates to a decorative pleatable material adapted for the fabrication of energy-efficient pleated shades and the method of manufacturing such material.

2. Description of the Prior Art

Pleated shades of various construction have been in use for many years. They have been manufactured in continuous form utilizing pleating machines. The materials that have been used for fabrication of the pleated shades have included polyester fabrics, laminated cottons and non-wovens. Among the most recent materials utilized in pleated shade fabrication are vacuum metalized polyester fabrics. The metalized coat on such polyester fabrics does not, however, provide a decorative face, rather the deposited metal, generally aluminum, forms a coating that is dull grey in appearance. Vacuum metalized fabrics also lack opacity, that is, a portion of the sunlight is neither absorbed nor reflected and is thereby allowed to pass through the fabric.

Indeed, pleated fabrics of the prior art used for window treatment have typically not been able to prevent light passage because the structure of fabrics inherently has openings through which light passes. This is true even where fabrics have been dyed and/or printed in vapor phase systems. Universally, the resultant decorative finishes still permit the passage of substantial light through the fabric.

SUMMARY OF THE INVENTION

In accordance with the present invention, a decorative pleated shade of high opacity (90% or higher) has been developed by carefully tailoring the coating composition and architecture to prevent blocking during manufacture and to achieve opacity and pleat retention over the life of the pleated fabric.

This has been achieved by utilizing a specific combination comprised of a pleatable substrate fabric, capable of accepting and retaining a pleat, and a polymeric coating applied in the form of multiple decorative layers. The polymeric ink coating preferably is applied to the fabric as a preformed overlay that is applied in such a manner that a high level of opacity is achieved.

A key to achieving the desired properties of the pleatable material of the present invention resides in forming a decorative coat of multiple layer architecture (at least 3 layers are required) and associating said coat with a fabric substrate that is pleat-retaining/pleatable by means of an intermediate resin layer disposed between the multiple layer decorative coat and the pleatable fabric. A top-coat is applied over the decorative coat as a protective layer and for the purpose of preventing blocking during pleating. It is critical that the exposed decorative surface of the pleatable material have a composition such that blocking is prevented at the temperatures of pleating.

BRIEF DESCRIPTION OF THE DRAWINGS

The invention is illustrated in the accompanying drawing wherein.

DETAILED DESCRIPTION

Figure 1:
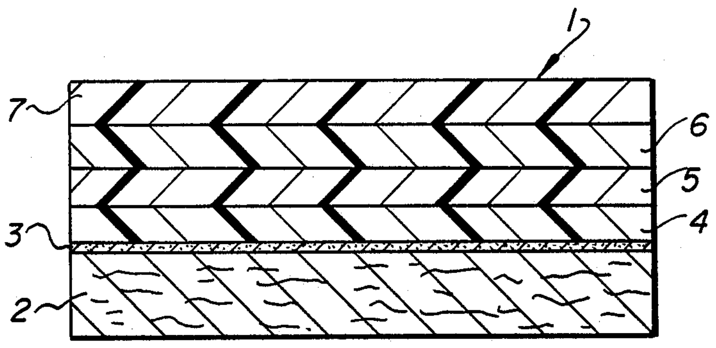
FIG. 1 is a schematic representation of the decorative pleatable material of the present invention showing the disposition of the various lamina.

Referring to FIG. 1, the pleatable material 1 is comprised of a pleatable fabric 2, a polyurethane resin layer 3, three layers of a pigment containing cross-linked acrylic or polyurethane polymer indicated respectively by numerals 4, 5 and 6 and a topcoat denominated by the numeral 7.

Figure 2:
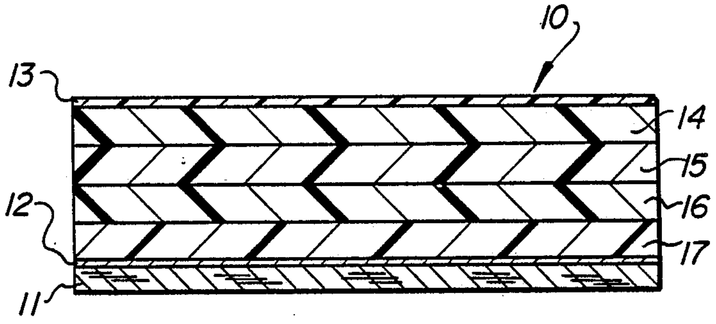
FIG. 2 is a schematic representation of a transfer film (film and transfer web) which is used to transfer a film comprised of performed lamina onto fabric substrate.

FIG. 2 illustrates the film transfer strip 10 that is used in manufacture of the pleatable material 1. The film transfer strip comprises paper 11 with a release film 12 which together form a release web. The film on the release web is comprised of a cellulose acetate propionate (CAP), a film forming cellulose derivate layer 17, which contains an anti-blocking agent, three layers of a pigment-containing acrylic or polyurethane polymer indicated respectively by the numerals 14, 15 and 16 and a polyurethane resin layer 13.

Suitable fabrics for use in the present invention are pleat-retaining fabrics such as polyester fabrics or polyester blend fabrics. Other pleat-retaining fabrics such as cotton having pleat-retaining film backings laminated thereto are also suitable. Polyester films and coextruded polyester films are the pleat-retaining backing films of choice for cotton fabric. The decorative finish achieved in accordance with the present invention may be applied to polyester fabrics that are metalized such as SATIN manufactured by Sharr Industries, Inc., Bloomfield, Connecticut. The polyester and polyester blend fabrics, prior to application of the intermediate coat, must be finished; that is, scoured and present to achieve adhesion and stability during further processing.

The intermediate resin layer, herein also alternatively referred to as the first or bottom layer, functions as a base coat on the surface of the fabric to which a decorative coating is applied. The intermediate layer provides/enhances bonding through melting, acting as a hot melt adhesive. The continuous layer also serves to prevent blow-through during application of the polymeric ink layers that, in combination, form the decorative coat. Thus, a uniformity of color and design are maintained on the decorative face of the fabric and as well, the integrity of the finish on the other side of the fabric is not affected by ink blow-through.

The decorative and bottom coats may be applied directly or preferably, as noted before, are transferred onto the fabric using film transfer after the intermediate layer and decorative coating are preformed on a transfer web.

The bottom layer is less than about 1 mil thick at least about 0.1 mil thick and most preferably is about 0.2 mil in thickness. Above about 1 mil unacceptable stiffness has been observed in the resultant decorative fabric and adhesion is adversely affected.

The intermediate layer is applied to achieve a barrier between the back of the fabric and the face of the fabric which receives the decorative finish.

The intermediate layer is continuous and uniform over the face of the fabric and extends within the fabric structure. For purposes of defining the present invention, "continuous" means "a continuum of coating over the width and length of the web" and when the statement is made that the intermediate layer extends within the fabric structure it means that the layer is embedded in the fabric thickness, the structure of the fabric.

A continuous, uniform intermediate coating is achieved by normal state of the art application of the coating with the method utilized.

The intermediate layer is extended within the structure of the fabric by insuring that the lay down is uniform over the web and smooth as a finish.

It is essential that the bottom layer is comprised of one or more polyurethane resins. The resins must have cross-linkable sites.

Water-based polyurethanes, such as SPENSOL brand aliphatic polyurethanes available from NL Chemicals, Hightstown, N.J., are preferred; with aliphatic polyurethanes being most preferred. SPENSOL L51, an aliphatic urethane resin used in flexographic, gravure inks and overprint varnishes, a fully reacted polyurethane elastomer (with no free isocyanate), is an example of the suitable SPENSOL brand resins that has been used with great success. Another suitable aliphatic urethane resin, is UE 40-357 brand polyurethane resin distributed by Permuthane Inc., Peabody, Mass., a member of the ICI group (U.K.).

The resins that form the intermediate layer may be applied directly onto a face of the substrate fabric in the form of an emulsion. The coating composition suitably comprises (1) an aqueous polyurethane emulsion containing ammonia as neutralizer; (2) an antifoam agent such as FOAMKILL, a brand of silicone antifoam agent distributed by Crucible Chemical Co., Greenville, S.C., or some other general purpose antifoam agent for water-base systems; and, (3) in certain cases a slip aid additive such as SLIP AID 144, a brand of Daniel Products Co., Jersey City, N.J. The antifoam agent functions to control and prevent foam. Where a water-based coating composition is used to form the intermediate layer, antifoam agent is required. The slip aid wax, SLIP AID 144, is a micronized powder polyolefin blend in the form of a dispersion. It serves to reduce friction and increases mar resistance during handling, an important feature where the intermediate layer is exposed and forms the top layer of a transfer film, as is the case where film transfer is used in forming the decorative pleatable material. The slip aid additives suitable for use in the present invention are those suitable for use in a polyurethane film. Slip aid additives, as appreciated in the art, reduce friction and increase mar resistance. Among the suitable slip aid additives are polymeric waxes such as polyolefinic waxes.

The decorative coating, which is applied over the intermediate layer, is comprised of at least three individually applied polymeric ink layers. The decorative coating preferably is from about 0.2 mils to 2.0 mils in thickness, most preferably about 0.5 mils. Each of the multiple layers is less than about 0.5 mils in thickness, each layer has a thickness of from about 0.05 mils up to about 0.5 mils.

The polymeric ink formulations which are used to produce each polymeric ink layer may contain a flattening agent to increase body. It is essential that a thermosetting additive be present in the polymeric ink formulations.

A flattening agent, as defined herein, means a fumed silica of high specific surface and/or its equivalent.

Where fumed silicon dioxide is used as the flattening agent, amorphous fumed silica (Ctl. #11-5), AEROSIL 200, available from the Degussa Corporation, Ridgefield Park, N.J., may be used.

The term "thermosetting additive," as used herein, refers to a composite additive comprising cross-linking agent for the polymer in the polymeric ink formulation, a catalyst to initiate cross-linking and blocking agent for the catalyst, typically an amine.

During pleating, the flattening agent prevents blocking, that is, fusing together of fabric surfaces. Without wishing to be bound, it is believed that fumed silica, which has a high heat stability and a high specific surface, provides high surface area submicron particles within the polymer film onto which molten polymer formed during heat setting and pleating is absorbed thus forming an active barrier between polymer molecules during heat setting and pleating.

The thermosetting agent, after cure, decreases the thermoplasticity of the polymer component of the ink and, in combination with flattening agent, produces the required antiblocking surface required for pleating and/or heat setting.

The flattening agent is used in an amount of from about 1% parts by weight to about 10% parts by weight, based on the amount by weight of resin in the solution. Preferably the amount of flattening agent present is from about 4% parts by weight to about 6% parts by weight, based on the amount by weight of resin in the solution.

The thermosetting additive is used in an amount of from about 5.0% parts by weight to about 15% parts by weight, based on the amount by weight of resin in the solution.

The polymeric inks useful in forming the polymeric ink layers of the decorative coat of the present invention contain (a) polymer having cross-linking sites; (b) cross-linking agent; (c) solvent and cross-linking catalyst appropriate to the selected polymer and cross-linking agent in the ink (d) flattening agent; and, (e) pigment.

The polymer may be a homopolymer or copolymer selected from cross-linkable (a) acrylic polymers or (b) polyurethanes.

Acrylic polymer components of the inks of the present invention include polyacrylates and polyacrylonitriles having cross-linking sites. Acrylic resins available from B.F. Goodrich Chemical Group, Cleveland, Ohio, under the brand CARBOSET have been used in formulating polymeric inks of the present invention.

In particular, a mixture of such acrylic resins comprising about 20% by weight CARBOSET Resin No. XL-11 (m.w. 30,000) about 75% by weight CARBOSET Resin No. XL-44 (m.w. 30,000) and about 5% by weight CARBOSET Resin No. 515 (m.w. 7,000) has been found to be among the preferred thermoplastic acrylic resins suitable for use in polymeric ink formulations.

Thermosetting components of the inks of the present invention include modified or unmodified melamine resins and urea formaldehyde resins, such as those available under the brand name CYMEL, available from American Cyanamid Co., Wayne, N.J. In particular, CYMEL Resin Nos. 300 and 303 have been found particularly suitable for use in the polymeric inks required to provide the decorative coat of the present invention. CYMEL 300 is a modified melamine-formaldehyde resin, identified by American Cyanamid as a hexamethoxymethylmelamine derivative.

The coloring matter of the polymeric ink may be either an organic or inorganic pigment. Combinations of such pigments may be used such that both organic and inorganic color-imparting materials are present in the ink and/or combinations of two or more organic or inorganic pigments are present. Pigments such as $TiO_2$, a white pigment, and tinting pigments imparting various colors of choice to polymeric substrates may be used in the polymeric ink formulation of the present invention in appropriate amounts of develop the color/tint desired. Generally, the $TiO_2$ content will be within the range of from about 40% to about 60% by weight, based on 100% weight formula of coating. Suitable tinting pigments which may be present, depending on the /tint selected are copper phthalocyanine, red 184, yellow 83 and carbon black 7. The tinting pigments may be present in amounts up to about 10% based on 100% weight formula of coating. In place of $TiO_2$, which is utilized where a matte finish is desired, superfine pearlescent can be substituted to achieve a shiny pearlescent finish. Aluminum powder can likewise be used in place of $TiO_2$ to provide a metallic finish.

Suitable catalyst systems for use in the polymer inks of the present invention comprise an acid catalyst such a paratoluenesulfonic acid blocked with an amine inhibitor such as an isopropanolamine mixture, e.g., ISOPROPANOLAMINE MIXTURE available from Dow Chemical, Midland, Mich., a mixture of mono-, di- and triisopropanolamines in amounts of 12, 44 and 44% by wt., respectively.

The decorative pleatable material of the present invention may be produced by two alternative methods. Such methods of producing a pleatable decorative fabric represent new and improved methods of constructing pleatable decorative fabrics.

One method involves direct application of polymeric inks comprised of thermoplastic polymer, pigments as colorants and other additives rendering thermosetting characteristics during the curing process. Direct application can be effected by spraying, rod coating, flexographic or gravure printing, by means of rotary or flat screens and other equivalent methods of achieving a uniform film. Alternatively, a flexible web carrying a dry removable film of required achitecture can be used to transfer such film continuously by feeding pleatable fabric substrate and the film web concurrently through the nip of a two bowl system calender under pressure and temperature. The film that is transferred penetrates into the structure of the substrate fabric without breaking.

The exposed surface of the decorative coating should be protected by a top-coat. The top-coat is applied to prevent "aging," that is, deterioration by handling and to prevent blocking during pleating and/or folding.

The top-coat is applied over the outermost lamina of the decorative coat. Application must be prior to pleating. The top-coat is applied before cure of the decorative coat in order to enhance bonding of top-coat to the outer layer of the decorative coat.

The top-coat is formed by cross-linking a polymer mixture composed of a polyester or polyurethane having cross-linking sites and a silicone polymer having cross-linking sites with a cross-linking agent. Suitable cross-linking agents include melamine, urea formaldehyde and aziridenes.

The resins suitable for use in the top-coat include the polyesters suitable for use in the formation of the decorative lamina of the pleatable material of the present invention. Suitable silicone polymers with cross-linkable sites include polyester modified hydroxy functional polydimethyl siloxane. These compounds are reactive organo-modified polysiloxanes that react with OH groups, with the binder and by their high interfacial activity, the products spread on the surface and due to reactivity is retained there.

A specific silicone polymer that has been used with great success is BYK 370, a polyester modified hydroxy functional polydimethyl siloxane, available from BYK Chemie USA, Wallingford, Conn.

Cross-linking of the polyester or polyurethane and polysilicone components of the top-coat is essential. In the absence of such cross-linking, the silicone antiblocking agent migrates to the surface, adversely affecting pleating by interfering with the blades of the pleating apparatus and adversely affecting the appearance of the pleated material by silicone blooming.

The method of pleating used to pleat the treated materials of the present invention is the same as that used for pleating fabrics of the prior art; that is, the pleatable materials of the present invention are pleated in the same fashion as the polyester fabrics and metalized polyester fabrics would be pleated without the multilayer film applied in accordance with the present invention.

Where the decorative fabrics of the present invention are folded and pleated for use in fabrication of window coverings, pleating, in accordance with the present invention, can be achieved using pleating machines manufactured by Chandler Ayer, Mass. Pleating is effected at temperatures of from about 200° F. to about 300° F., preferably about 240° F. to about 280° F., although temperatures and the pressure utilized to maintain uniform stacking generally is from about 20 to 100 psi.

The total thickness of the multi-layered film applied to the fabric, whether directly or by web transfer, should not exceed 20 mils. Where such thickness is exceeded, both flexibility and adhesion of the materials of the present invention are adversely affected. Preferably, the total thickness of the multi-layer coat applied to the fabric used in making the decorative pleatable material of the present invention falls within the range of from about 0.2 mils to about 10 mils and most preferably within the range of from about 0.2 to about 6 mils.

The polymeric ink coat, formed by multiple uniform layers overlying one another, is comprised of compatible resin layers cross-linked at their interfaces, one with the other. The use of multi-layer architecture provides body to the film.

It is essential in order to achieve an acceptable finish and the required high opacity to uniformly print each layer, that is, to achieve a smooth, level surface with no pin-holes, streaks or pit defects. One of the observed advantages of multiple layer architecture is that any defect in one layer is generally compensated for by an overlying or underlying layer.

One aspect of the present invention relates to decorating a plain or metalized polyester fabric by dry film transfer. The dry film transfer means is comprised of the elements set forth below:

A flexible web, suitably made of paper or its equivalent, on which high density polyethylene or polypropylene resins, acting as a release system, are either coated or extruded.

A bottom coat layer releasably secured to said web, applied by a gravure cylinder, rotary screen, rod coater or flexographic roll, and containing anti-block additives, such as a flattening agent, e.g., fumed silica, in a polymeric vehicle, that is heat resistant at pleating temperatures. Cellulose derivatives in solvent systems, dried by usual print methods, may be used as bottom coats.

At least three-layers of polymer inks applied by a gravure, rotary screen, flexographic or rod coating machine, such inks containing lightfast organic and inorganic pigments in a thermoplastic polymer, suitably either acrylic copolymers, polyurethanes or vinyl copolymers capable of cross-linking to form thermosetting films, which may contain anti-block additives and leveling agents. A drying stage is used after every stage of application of the polymer inks to remove residual solvents.

A top coat applied by a gravure cylinder, rotary screen, rod coater or flexographic roll suitably incorporating a waterborne vehicle based on polyurethane polymers with a slip aid additive to act as a protective layer, dried by usual drying methods.

Transfer of the film may be carried out continuously by feeding the substrate and the film web concurrently through the nip of a two bowl system calender under pressure, from about 20 to about 100 psi, preferably from about 45 to about 80 psi and at an elevated temperature, preferably from about 135° C. to about 150° C., with a speed varying from 2–10 yards/minute. Release can be effected after about 3 seconds and preferably 10–30 seconds after leaving the nip with the aid of let off and pick-up controlling rolls, allowing cooling of the film web and the substrate before separation. The film is actually sandwiched between the web and the fabric. The film leaving the web penetrates into the structure of the fabric to enhance adhesion and cross-linking. It is essential that delayed transfer be used in order to allow adequate adhesion to the fabric and release from the web.

The transferred fabric (fabric and film) is subjected to pre- and postcuring for 90 seconds at 170° C. and 40 seconds at 200° C. consecutively using an oven and a heated drum. This stage will cause the polymeric ink to cross-link to a thermosetting layer of coating material adhered permanently to the fabric. After cure, the fabric with the transferred film thereon is ready to pleat.

The coated fabric finds particular utility when pleated into shades for window coverings.

In the embodiment of the present invention, where the film transfer is used in producing decorative pleatable material, the calendering step used in film transfer enhances uniformity.

EXAMPLE I

A metalized polyester fabric pre-set at 405° C., SATIN, manufactured by Sharr Industries, Inc., Bloomfield, Conn., is treated to produce a decorative pleatable material by dry film transfer.

A flexible web of polyethylene coated paper is used as the release "paper" for formation and transfer of dry film for application to a pleatable fabric.

A six stage ROTOMEC brand gravure printing machine, manufactured by S. Giorgios, Italy, is used and the below printing sequence is followed:

| STAGE | CYLINDER | INK/COATING | APPLICATION/ DRYING TEMP. | VISCOSITY* |
|---|---|---|---|---|
| 1 | 95Q | BOTTOM COAT | 250° F. | 23 SECONDS |
| 2 | 125QCH | POLYMERIC INK | 260° F. | |
| 3 | 120Q | POLYMERIC INK | 250° F. | 21 SECONDS |
| 4 | 125QCH | POLYMERIC INK | 260° F. | |
| 5 | 137 HELIO | TOP COAT | 280° F. | 20 SECONDS |
| 6 | PULL NIP | — | 250° F. | |

SPEED 120 FT/MINUTE

WEB: POLYETHYLENE COATED PAPER (30 to 40 lb. paper with polyethylene extruded thereon, supplied by Thilmany Pulp and Paper Co. of Kaukuana, Wisconsin)

SOLVENT: STAGE 1–4 ACETATE MIXTURE (1 part n-propyl acetate, and 9 parts ethyl acetate)

STAGE 5 AMMONIA WATER 4%

*#2 Zahn cup.

The ink and coating formulations applied are:

| INK/COATING FORMULATIONS: | PARTS* |
|---|---|
| BOTTOM COAT (STAGE 1) | |
| CELLULOSE ACETATE PROPIONTE | 20 |
| ETHYL ACETATE | 75 |
| FLATTENING AGENT | 5 |
| (AMORPHOUS FUMED SILICA AEROSIL 200) | 100 |
| POLYMERIC INK (STAGES 2, 3, 4) | |
| ACRYLIC COPOLYMER[1] | 20 |
| RUTILE $TiO_2$ PIGMENT | 38 |
| ETHYL ACETATE | 30 |
| MELAMINE CROSS-LINKING AGENT | 5 |
| BLOCKED ACID CATALYST[2] | 5 |
| FLATTENING AGENT | 2 |
| (AMORPHOUS FUMED SILICA AEROSIL 200) | 100 |
| TOP COAT (STAGE 5) | |
| POLYURETHANE EMULSION[3] | 80 |
| ANTIFOAM AGENT[4] | 0.3 |
| SLIP AID WAX[5] | 3.0 |
| AMMONIA WATER 4% | 16.7 |

-continued

| INK/COATING FORMULATIONS: | PARTS* |
|---|---|
| | 100 |

*Parts by weight based on 100% formula.
[1]A mixture of acrylic resins comprised of about 20% by weight CARBOSET Resin No. XL-11 (m.w. 30,000) about 75% by weight CARBOSET Resin No. XL-44 (m.w. 30,000) and about 5% by weight CARBOSET Resin No. 515 (m.w. 7,000) available from B. F. Goodrich Chemical Group, Cleveland, Ohio.
[2]Paratoluenesulfonic acid inhibited with ISOPROPANOLAMINE MIXTURE available from Dow Chemical, Midland, Michigan, a mixture of mono-, di- and triisopropanolamines in amounts of 12, 44 and 44% by wt., respectively.
[3]SPENSOL L51 brand, NL Chemicals, Hightstown, New Jersey.
[4]FOAMKILL brand silicone antifoam agent, Crucible CHemical Co., Greenville, South Carolina.
[5]SLIP AID BRAND, micronized powder polyolefin blend of Daniel Products, Co., Jersey City, New Jersey.

The gravure printing machine, typical of gravure machine printing systems of the art, provides for application and drying at each stage whereby each suceeding coat is applied over a dried surface. It is essential that the drying temperature be below the curing temperature, preferably about 100° F. below the curing temperature. This, to avoid premature curing which adversely affects the end product.

Film transfer from web (release paper) to fabric is achieved employing a two bowl transfer calender under the following transfer conditions:

| TRANSFER CONDITIONS |
|---|
| PRESSURE 65 PSI |
| HEAT 142° C. |
| SPEED 6 YARDS/MINUTE DELAYED TRANSFER |

After film transfer the film transferred onto the fabric is cured. Curing is accomplished in a two-step precure and postcure process under the following conditions:

| CURING CONDITIONS | | |
|---|---|---|
| PRECURE | 350° F. | 90 SECONDS |
| POSTCURE | 400° F. | 40 SECONDS |

Precure is effected using a gas heated curing oven, coupled with an oil heated drum, similar to a heat transfer calender.

The fabric with cured (thermoset) film coating thereon is thereafter pleated using a Chandler Ayer pleating machine at conditions of 240°-280° F. and a pressure of 40 psi. A pleated fabric with a uniform snow white matte finish having about 99% opacity is obtained.

EXAMPLE II

The metalized polyester fabric of Example I is treated as described in Example I to produce a decorative pleatable material of pale peach color by adding tinting colors to the Rutile $TiO_2$ in the polymeric ink used in stages 2, 3 and 4 the following amounts: red 184, 0.5% and yellow 83, 0.2%.

The pale peach colored decorative pleatable material after pleating as described in Example I has a matte finish and an opacity of 100%.

EXAMPLE III

The metalized polyester fabric of Example I is treated as described in Example I to produce a decorative pleatable material of aqua color by adding tinting colors to the Rutile $TiO_2$ in the polymeric ink used in stages 2, 3 and 4 the following amounts: yellow 83, 0.4% and copper phthalocyanine. 0.5%.

The aqua colored decorative pleatable material, after pleating, as described in Example I, has a matte finish and an opacity of 98%.

EXAMPLE IV

The metalized polyester fabric of Example I is treated as described in Example I to produce a decorative pleatable material of pearlescent luster by substituting for the Rutile $TiO_2$ in the polymeric ink used in stages 2, 3 and 4 from about 40% to about 60% based on total weight of formulation of a pearlescent superfine powder characterized by particle size of 5-50 microns of $TiO_2$ coated mica plates.

The pearlescent decorative pleatable material, after pleating, as described in Example I, has an opacity of 100% and a shiny pearlescent finish.

EXAMPLE V

The metalized polyester fabric of Example I is treated as described in Example I to produce a decorative pleatable material of metallic silver color by substituting for the Rutile $TiO_2$ in the polymeric ink used in stages 2, 3 and 4 metallic aluminum paste available from U.S. Bronze, N.J.

The metallic silver colored decorative pleatable material after pleating as described in Example I has a metallic finish and an opacity of 100%.

EXAMPLE VI

A metalized polyester fabric pre-set at 405° C., SATIN, manufactured by Sharr Industries, Inc., Bloomfield, Conn., is treated to produce a decorative pleatable material by film formation directly on the fabric.

A six stage ROTOMEC brand gravure printing machine, manufactured by S. Giogios, Italy, is used and the following printing sequence is followed:

| STAGE | CYLINDER | INK/COATING | APPLICATION/ DRYING TEMP. | VISCOSITY |
|---|---|---|---|---|
| | | | | (Zahn Cup #2) |
| 1 | 120Q | BOTTOM COAT | 220° F. | 19-25 SECONDS |
| 2 | 125QCH | POLYMERIC INK | 230° F. | 19-25 SECONDS |
| 3 | 125QCH | POLYMERIC INK | 240° F. | 19-25 SECONDS |
| 4 | 120Q | POLYMERIC INK | 250° F. | 19-25 SECONDS |
| 5 | 120Q | TOP COAT | 325° F. | 19-25 SECONDS |
| 6 | PULL NIP | — | 350° F. | 19-25 SECONDS |
| SPEED: | 150 FT/MINUTE | | | |
| SOLVENT: | STAGES 1-4 | Acetate mixture | | |
| | STAGE 5 | Isopropyl Alcohol and Heptane Mixture | | |

The ink and coating formulations applied are:

| INK/COATING FORMULATIONS: | PARTS |
|---|---|
| BOTTOM COAT (STAGE 1) | |
| POLYURETHANE EMULSION[6] | 83 |
| ANTIFOAM AGENT[7] | 0.3 |
| AMMONIA WATER 4% | 16.7 |
| | 100 |
| POLYMERIC INK (STAGES 2, 3, 4) | |
| ACRYLIC COPOLYMER[8] | 52 |
| RUTILE $TiO_2$ PIGMENT | 30 |
| MELAMINE CROSS-LINKING AGENT | 8 |
| BLOCKED ACID CATALYST[9] | 5 |
| FLATTENING AGENT | 5 |
| (AMORPHOUS FUMED SILICA | 100 |
| AEROSIL 200) | |
| ACETATE MIXTURE SOLVENT | (to adjust viscosity) |
| TOP COAT (STAGE 5) | |
| POLYESTER POLYMER[10] | 80 |
| MELAMINE CROSS-LINKING AGENT | 10 |
| ACIDIC CATALYST[11] | 5 |
| SILICONE POLYMER[12] | 5 |
| | 100 |
| HEPTANE/ISOPROPYL ALCOHOL SOLVENT (to adjust viscosity) | |

[6]SPENSOL L51 brand, NL Chemicals, Hightstown, New Jersey.
[7]FOAMKILL brand silicone antifoam agent, Crucible Chemical Co., Greenville, South Carolina.
[8]A mixture of acrylic resins comprised of about 20% by weight CARBOSET Resin No. XL-11 (m.w. 30,000) about 75% by weight CARBOSET Resin No.XL-44 (m.w. 30,000) and about 5% by weight CARBOSET Resin No. 515 (m.w. 7,000) available from B. F. Goodrich Chemical Group, Cleveland, Ohio.
[9]Paratoluenesulfonic acid inhibited with ISOPROPANOLAMINE MIXTURE available from Dow Chemical, Midland, Michigan, a mixture of mono-, di- and triisopropanolamines in amounts of 12, 44 and 44% by wt., respectively.
[10]DURACRON, manufactured by PPG, Pittsburgh, Pennsylvania, a saturated polyester polymer with hydroxyl functional groups as cross-linkable sites.
[11]Paratoluene sulfonic acid.
[12]BYK 370, a polyester modified hydroxy functional polydimethyl siloxane, available from BYK Chemie USA, Wallingford, Connecticut.

The coated metalized polyester fabric withdrawn from the ROTOMEC printing machine is cured at 405° C. for 1 to 2 minutes in a curing oven to insure thermosetting of the bottom coat, polymeric ink layers and top-coat.

The fabric with cured (thermoset) coating thereon is thereafter pleated using a Chandler Ayer pleating machine at the same conditions as in Example I.

A pleated fabric with a uniform gloss finish having 98% opacity is obtained.

As is evident from the foregoing, various modifications can be made without departing from the spirit of the invention. It is not intended to limit the invention to the details heretofore recited, the invention being defined in the claims which follow.

I claim:

1. A pleatable material comprising:

a. a pleatable fabric;

b. a continuous uniform first polyurethane resin layer on the face of the fabric forming a barrier between the back and face of the fabric;

c. a continuous uniform decorative coating overlying said first polyurethane resin comprised of a bottom layer, a top layer and at least one intermediate layer, said layers each comprised of a pigment-containing cross-linked first acrylic or second polyurethane polymer; and d. a continuous uniform top-coat overlying the top layer of said decorative coating comprised of (1) cross-linked resin selected from the group consisting of cross-linked polyester resin, second cross-linked acrylic resin, and third cross-linked polyurethane resin or (2) a film forming cellulose derivative, said cross-linked resins and cellulose derivative containing an anti-blocking agent comprising particulate silica, silicone polymer or a combination of particulate silica and silicone polymer;

wherein the bottom layer of the decorative coating is cross-linked with the first polyurethane resin layer at the interface of said bottom and first urethane layers and each layer of said decorative coating is cross-linked with each overlying layer.

2. The pleatable material of claim 1 wherein the pleatable fabric is a polyester fabric, polyester blend fabric, or cotton having a pleat retaining film backing laminated thereto.

3. The pleatable material of claim 2 wherein the cotton having a pleat retaining film backing laminated thereto is backed with a polyester film.

4. The pleatable material of claim 1 wherein the first polyurethene resin layer is of a thickness of about 0.1 to about 1.0 mils.

5. The pleatable material of claim 1 wherein the first polyurethene resin layer is of a thickness of about 0.2 mils.

6. The pleatable material of claim 1 wherein the first cross-linked acrylic polymer is a cross-linked polyacrylate or polyacrylonitrile.

7. The pleatable material of claim 1 wherein the first cross-linked acrylic resin comprises a mixture of cross-linked polyacrylate resins.

8. The pleatable material of claim 1 wherein the first polyurethane resin is an aliphatic polyurethane resin.

9. The pleatable material of claim 1 wherein the cross-linked resins are cross-linked with melamine, urea formaldehyde, modified melamine or modified urea formaldehyde cross-linking agents.

10. The pleatable material of claim 1 wherein the pigment is selected from the group consisting of particulate $TiO_2$, aluminum and pearlescent pigment.

11. The pleatable material of claim 10 wherein the pearlescent pigment is comprised of a superfine powder of titanium dioxide-coated mica plates of a particle size within the range of from about 5 to about 55 microns.

12. The pleatable material of claim 10 wherein the $TiO_2$ pigment is Rutile $TiO_2$ pigment.

13. The pleatable material of claim 1 wherein the pigment is present in an amount of from about 40% by weight to about 60% by weight based on combined weight of resin and pigment in the decorative coating.

14. The pleatable material of claim 10 wherein the pigment is present in an amount of from about 40% by weight to about 60% by weight based on combined weight of resin and pigment in the decorative coating.

15. The pleatable material of claim 1 wherein said pigment comprises a tinting pigment.

16. The pleatable material of claim 10 wherein said pigment further comprises a tinting pigment.

17. The pleatable material of claim 1 wherein the pigment-containing, first cross-linked acrylic or second polyurethane polymer further contains a flattening agent.

18. The pleatable material of claim 17 wherein the flattening agent is fumed silica.

19. The pleatable material of claim 17 wherein each layer of the decorative coating has a thickness of from about 0.05 to about 0.5 mils and the decorative coating has a thickness of from about 0.2 mils to about 2.0 mils.

20. The pleatable material of claim 1 wherein the film forming cellulose derivative in said top-coat is cellulose acetate propionate which contains amorphous fumed silica.

21. The pleatable material of claim 20 wherein said amorphous fumed silica is present in an amount of from about 10% to about 30% based on the weight of resin and silica.

22. The pleatable material of claim 1 wherein said top-coat resin is comprised of a polyester resin cross-linked with a silicone resin.

23. The pleatable material of claim 22 wherein said silicone resin is a cross-linkable siloxane resin.

24. The pleatable material of claim 1 wherein the thickness of the first polyurethane layer, decorative coating and top-coat is from about 0.2 to about 10 mils.

25. The pleatable material of claim 4 wherein the thickness of the first polyurethane layer, decorative coating and top-coat is from about 0.2 to about 10 mils.

26. The pleatable material of claim 19 wherein the thickness of the first polyurethane layer, decorative coating and top-coat is from about 0.2 to about 10 mils.

27. The pleatable material of claim 1 wherein the thickness of the first polyurethane layer, decorative coating and top-coat is from about 0.2 to about 6 mils.

28. The pleatable material of claim 1 wherein the thickness of the first polyurethane layer, decorative coating and top-coat is from about 0.2 to about 6 mils.

29. The pleatable material of claim 1 wherein the thickness of the first polyurethane layer, decorative coating and top-coat is from about 0.2 to about 6 mils.

30. A pleatable fabric comprised of a pigment-containing resin coat adhered to a face of said fabric by means of a continuous uniform first polyurethane layer embedded in the structure of said fabric and forming a barrier between the back and face of said fabric, said pigment-containing resin coat being overlaid with a top-coat comprised of a cellulose derivative resin containing amorphous fumed silica.

31. A pleated fabric comprised of a pigment-containing resin coat adhered to a face of said fabric by means of a continuous uniform first polyurethane layer embedded in the structure of said fabric and forming a barrier between the back and face of said fabric, said pigment-containing resin coat being overlaid with a top-coat comprised of a cellulose derivative resin containing amorphous fumed silica.

32. A pleatable fabric comprised of a pigment-containing resin coat adhered to a face of said fabric by means of a continuous uniform first polyurethane layer embedded in the structure of said fabric and forming a barrier between the back and face of said fabric, said pigment-containing resin coat being overlaid with a top-coat comprised of a polyester resin cross-linked with a silicone resin.

33. A pleated fabric comprised of a pigment-containing resin coat adhered to a face of said fabric by means of a continuous uniform first polyurethane layer embedded in the structure of said fabric and forming a barrier between the back and face of said fabric, said pigment-containing resin coat being overlaid with a top-coat comprised of a polyester resin cross-linked with a silicone resin.

34. A film transfer strip comprising:

a. a web with a release film thereon;

b. a layer of film forming cellulose derivative containing particulate silica releasably supported on the release film on said web;

c. a continuous uniform decorative coating overlying said layer of film forming cellulose derivative comprised of a bottom layer, a top layer and at least one intermediate layer, said layers each comprised of a pigment-containing acrylic polymer and thermosetting additive; and d. a continuous uniform first polyurethane resin layer overlying the top layer of the decorative coating.

35. The film transfer strip of claim 34 wherein the polyurethane resin layer contains a slip aid additive.

36. The film transfer strip of claim 35 wherein the slip aid additive is a polymeric wax.

* * * * *